United States Patent
Dugar et al.

(10) Patent No.: US 10,534,652 B1
(45) Date of Patent: Jan. 14, 2020

(54) EFFICIENT MOVEMENT OF VIRTUAL NODES DURING RECONFIGURATION OF COMPUTING CLUSTER

(71) Applicant: Amazon Technologies, Inc., Seattle, WA (US)

(72) Inventors: Rajib Dugar, Bellevue, WA (US); Ashish Manral, Seattle, WA (US); Ganesh Narayanan, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 205 days.

(21) Appl. No.: 15/638,015

(22) Filed: Jun. 29, 2017

(51) Int. Cl.
*G06F 9/50* (2006.01)
*H04L 29/08* (2006.01)
*H04L 12/24* (2006.01)

(52) U.S. Cl.
CPC .......... *G06F 9/5077* (2013.01); *G06F 9/5083* (2013.01); *G06F 9/5088* (2013.01); *G06F 9/5061* (2013.01); *H04L 41/0893* (2013.01); *H04L 67/10* (2013.01)

(58) Field of Classification Search
CPC .... G06F 12/02; G06F 15/8023; G06F 16/128; G06F 16/2282; G06F 3/0604; G06F 9/5088; G06F 9/5061; G06F 9/5077; G06F 9/5083; H04L 41/0893; H04L 67/10
See application file for complete search history.

(56) References Cited

U.S. PATENT DOCUMENTS

| | | | | |
|---|---|---|---|---|
| 9,378,067 B1* | 6/2016 | Agarwala | ............. | G06F 9/5088 |
| 9,779,015 B1* | 10/2017 | Oikarinen | ............... | G06F 12/02 |
| 2003/0088754 A1* | 5/2003 | Barry | .................. | G06F 15/8023 712/11 |
| 2012/0210047 A1* | 8/2012 | Peters | ................. | G06F 16/2282 711/103 |
| 2016/0205182 A1* | 7/2016 | Lazar | .................... | G06F 16/128 709/219 |
| 2016/0266801 A1* | 9/2016 | Marcelin Jemenez | ..................... | G06F 3/0604 |

OTHER PUBLICATIONS

Kuhn, Harold W. "The Hungarian Method for the Assignment Problem", 50 Years of Interger Programming 1958-2008, Springer-Verlag Berlin Heidelberg 2010, https://tom.host.cs.st-andrews.ac.uk/CS3052-CC/Practicals/Kuhn.pdf, 19 pages.
Wikipedia "Hungarian Algorithm", https://en.wikipedia.org/wiki/Hungarian_algorithm, Nov. 27, 2017, retrieved on Dec. 26, 2017, 5 pages.

* cited by examiner

*Primary Examiner* — Le H Luu
(74) *Attorney, Agent, or Firm* — Lowenstein Sandler LLP

(57) ABSTRACT

Given a current configuration of virtual node groups in a computing cluster and a new configuration indicating one or more changes to the virtual node groups, a cluster manager generates a reconfiguration plan to arrange virtual nodes into the desired virtual node groups of the new configuration while minimizing a number of virtual nodes to be moved between physical nodes in the computing cluster.

17 Claims, 8 Drawing Sheets

Convert to square matrix

|    | S1   | S2  | S3    | S4 |
|----|------|-----|-------|-----|
| D1 | 1000 | 900 | 0     | 0  |
| D2 | 800  | 0   | 0     | 0  |
| D3 | 0    | 100 | 0     | 0  |
| D4 | 0    | 0   | 13584 | 0  |

Fig. 6A

Convert to minimization problem

|    | S1    | S2    | S3    | S4    |
|----|-------|-------|-------|-------|
| D1 | 12584 | 12684 | 13584 | 13584 |
| D2 | 12784 | 13584 | 13584 | 13584 |
| D3 | 13584 | 13484 | 13584 | 13584 |
| D4 | 13584 | 13584 | 0     | 13584 |

Fig. 6B

Subtract row min from each row

|    | S1    | S2    | S3   | S4    |
|----|-------|-------|------|-------|
| D1 | 0     | 100   | 1000 | 1000  |
| D2 | 0     | 800   | 800  | 800   |
| D3 | 100   | 0     | 100  | 100   |
| D4 | 13584 | 13584 | 0    | 13584 |

Fig. 6C

Subtract col min from each col

|    | S1    | S2    | S3   | S4    |
|----|-------|-------|------|-------|
| D1 | 0     | 100   | 1000 | 900   |
| D2 | 0     | 800   | 800  | 700   |
| D3 | 100   | 0     | 100  | 0     |
| D4 | 13584 | 13584 | 0    | 13484 |

Fig. 6D

Find min # of lines to cross off zeros $$\begin{array}{c} \\ D1 \\ D2 \\ D3 \\ D4 \end{array} \begin{bmatrix} S1 & S2 & S3 & S4 \\ 0 & 100 & 1000 & 900 \\ 0 & 800 & 800 & 700 \\ \cancel{100} & \cancel{0} & \cancel{100} & \cancel{0} \\ 13584 & 13584 & 0 & 13484 \end{bmatrix}$$

Fig. 6E

Further Reduce $$\begin{array}{c} \\ D1 \\ D2 \\ D3 \\ D4 \end{array} \begin{bmatrix} S1 & S2 & S3 & S4 \\ 0 & 0 & 1000 & 800 \\ 0 & 700 & 800 & 600 \\ \cancel{200} & \cancel{0} & \cancel{200} & \cancel{0} \\ \cancel{13584} & \cancel{13484} & \cancel{0} & \cancel{13384} \end{bmatrix}$$

Fig. 6F

Make final assignment $$\begin{array}{c} \\ D1 \\ D2 \\ D3 \\ D4 \end{array} \begin{bmatrix} S1 & S2 & S3 & S4 \\ \cancel{0} & \boxed{0} & 1000 & 800 \\ \boxed{0} & 700 & 800 & 600 \\ 200 & \cancel{0} & 200 & \boxed{0} \\ 13584 & 13484 & \boxed{0} & 13384 \end{bmatrix}$$

Fig. 6G

EFFICIENT MOVEMENT OF VIRTUAL NODES DURING RECONFIGURATION OF COMPUTING CLUSTER

BACKGROUND

Cloud computing defines a model for enabling ubiquitous, convenient, on-demand network access to a shared pool of configurable computing resources (e.g., networks, servers, storage, applications, services) that can be rapidly provisioned and released with minimal management effort or service provider interaction. Certain characteristics of the cloud computing model include on demand self-service, broad network access, resource pooling, rapid elasticity, and measured service. Cloud computing can include several service models, including Software as a Service (SaaS), Platform as a Service (PaaS), and Infrastructure as a Service (IaaS). The cloud computing model may be implemented according to one of the several deployment models, including private cloud, community cloud, public cloud, or hybrid cloud.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

FIGS. 6A-6G are diagrams illustrating a data structure used to determine a reconfiguration plan for virtual node groups in a computing cluster, according to an embodiment.

DETAILED DESCRIPTION

Figure 1:
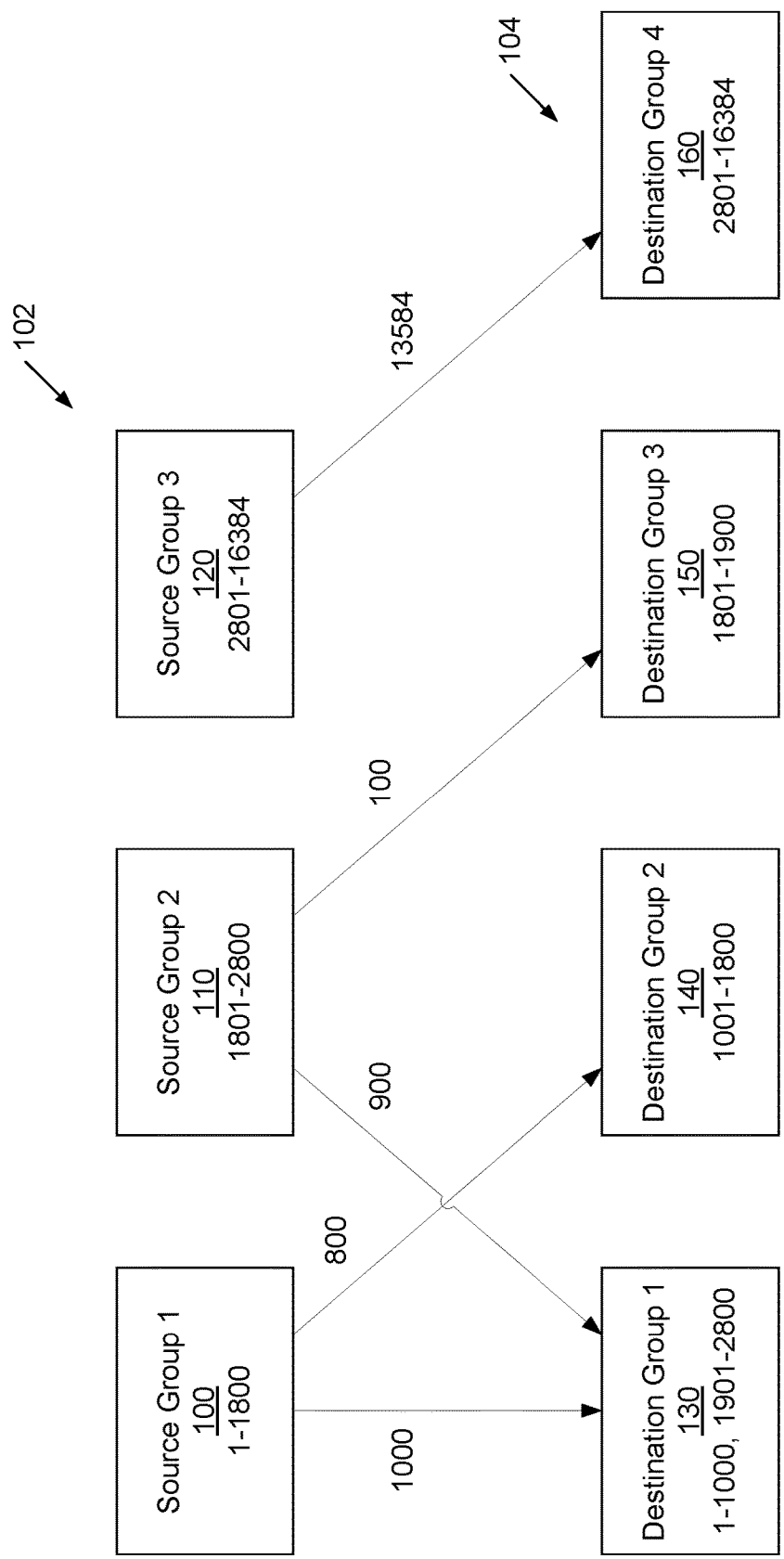
FIG. 1 is a block diagram illustrating efficient movement of virtual nodes during reconfiguration of a computing cluster, according to an embodiment.

Embodiments are described for efficient movement of virtual nodes during reconfiguration of a computing cluster. In one embodiment, a computing cluster formed from multiple physical nodes (e.g., host machines) connected together over a network implements a distributed data store such as a key-value database (e.g., NoSql, Redis). The data store may include a key space that includes the outermost grouping of data in the data store, and which may be divided into some number of slots. In one embodiment, the key space is divided into 16384 slots and each physical node in the computing cluster is assigned some portion of the 16384 slots. The slots may be referred to as "virtual nodes" since they represent a logical partition of the key space that is mapped to a corresponding physical node. In one embodiment, each of the virtual nodes (i.e., slots) is associated with a virtual node group (e.g., a shard) that includes all or a subset of the virtual nodes assigned to a particular one of the physical nodes in the computing cluster. For example, where a cluster includes two physical nodes, there may be a first virtual node group including all of the virtual nodes assigned to a first physical node and a second virtual node group including all of the virtual nodes assigned to a second physical node.

In one embodiment, the computing cluster, and the data store implemented thereon, supports the ability to reconfigure the cluster by adding or removing physical nodes. For example, a system administrator or a customer utilizing the computing cluster to execute cloud computing services may make a request or command to add a new empty physical node to the cluster or remove an existing physical node from the cluster. When a new physical node is added, some portion of the virtual nodes may be moved or reassigned from existing physical nodes to the new physical node. When an existing physical node is removed from the cluster, virtual nodes assigned to that physical node may be redistributed among the remaining physical nodes. In one embodiment, the reconfiguration may include rebalancing the virtual nodes among the physical nodes in the cluster without actually adding or removing any physical nodes in the cluster.

Live reconfiguration of the cluster (i.e., reconfiguration without a service interruption) includes the moving of virtual nodes, which can an expensive operation in terms of time and computing resources. In one embodiment, the administrator, customer or some other entity provides a desired configuration which specifies which virtual nodes (i.e., slots) are part of which virtual node groups (i.e., shards). It may be up to the discretion of a cluster manager to determine which virtual node group is to be associated with which underlying physical node in the new configuration. To achieve the desired configuration after the addition or removal of a physical node in the cluster, it may be advantageous to move a minimal number of virtual nodes between different physical nodes, since this is a time and resource intensive process. In one embodiment, given a current configuration (i.e., which virtual nodes are currently assigned to which virtual node groups) and a new configuration, the cluster manager may generate a reconfiguration plan to arrange virtual nodes into the desired virtual node groups while minimizing a number of movements of virtual nodes between physical nodes.

In one embodiment, in order to determine the reconfiguration plan, the cluster manager generates a data structure (e.g., a matrix) and populates the data structure with values reflecting the current and new configurations of the computing cluster. In one embodiment, the data structure is an m×n matrix M, where m is the number of virtual node groups in the current configuration and n is the number of virtual node groups in the new configuration. The individual elements in matrix M can be denoted by $M_{ij}$, where the maximum value of i is m and the maximum value of j is n. In one embodiment, the value of a particular element in the data structure is populated such that $M_{ij}$ represents a number of virtual nodes that are shared between current virtual node group i and new virtual node group j.

In one embodiment, the data structure (i.e., matrix M) represents an adjacency matrix of weighted graph G (an example of which is shown in FIG. 1). The weighted graph may be bi-partite graph and one goal is to maximize weight matching in the weighted bi-partite graph. Maximizing the weight matching will maximize the virtual nodes that are not moved as part of the reconfiguration. This results in minimizing the number of virtual nodes that need to be moved between physical nodes. By creating the data structure described above, the cluster manager can maximize the efficiency of the reconfiguration of the computing cluster by solving an assignment problem. In one embodiment, the cluster manager can determine which virtual node groups in the current configuration can be assigned to which virtual node groups in the new configuration. Once assigned, any virtual nodes that are not supposed to be part of a newly assigned virtual node group, as specified in the new cluster configuration, can be moved to the proper virtual node group. The techniques described herein can minimize this number of virtual nodes that are actually moved between groups/physical nodes.

FIG. 1 is a block diagram illustrating efficient movement of virtual nodes during reconfiguration of a computing cluster, according to an embodiment. In one embodiment, a current configuration 102 of a computing cluster includes a number of virtual nodes associated with a number of virtual node groups. In the illustrated embodiment, there are 16384 virtual nodes arranged into three virtual node groups 100, 110, 120. In one embodiment, each of the virtual node groups 100, 110, 120 includes all or a subset of the virtual nodes assigned to a particular underlying physical node in the computing cluster. For example, when the cluster includes three physical nodes, virtual node group 100 may include virtual nodes assigned to a first physical node, virtual node group 110 may include virtual nodes assigned to a second physical node, and virtual node group 120 may include virtual nodes assigned to a third physical node. In other embodiments, however, the current configuration may include any number of virtual nodes, any number of virtual node groups and any number of physical nodes. In one embodiment, the number of virtual node groups is the same as the number of physical nodes, with each virtual node group assigned to one physical node.

Depending on the embodiment, the virtual nodes may be distributed evenly among virtual node groups or may be distributed according to a custom configuration specified by the system administrator or customer. For example, the virtual nodes may be balanced according to different factors, such as memory usage (e.g., the size of the underlying data associated with each virtual node), network usage (e.g., the frequency with which the virtual nodes are accessed), processor usage, or other factors. In an example custom configuration, certain virtual nodes that use more resources may be part of a virtual node group containing a lower number of total virtual nodes, such that the available resources of the underlying physical node (e.g., host machine) may be more readily available. In the illustrated embodiment, virtual node group 100 includes virtual nodes 1-1800, virtual node group 110 includes virtual nodes 1801-2800 and virtual node group 120 includes virtual nodes 2801-16384.

In one embodiment, a new configuration 104 specifies a different arrangement of the same 16384 virtual nodes into virtual node groups 130, 140, 150, 160. In the new configuration 104, each of the 16384 virtual nodes are assigned to one of the virtual node groups. In one embodiment, the reconfiguration may be in response to the addition of a new physical node to the computing cluster. The new configuration 104 may specify which virtual nodes should be associated with each of virtual node groups 130, 140, 150, 160, but does not necessarily specify which virtual node group is assigned to each underlying physical node. Thus, it may be the responsibility of a cluster manager to generate a reconfiguration plan to arrange the virtual nodes into the new configuration 104 while minimizing a number of movements of virtual nodes between physical nodes.

In one embodiment, the cluster manager attempts to assign each of the current virtual node groups 100, 110, 120 to one of the new virtual node groups 130, 140, 150, 160. By maximizing the number of virtual nodes that are not moved as part of the reconfiguration, the cluster manager can minimize the number of virtual nodes that are moved between physical nodes. In one embodiment, the cluster manager determines how many virtual nodes would be retained if each of current virtual node groups 100, 110, 120 were assigned to one of new virtual node groups 130, 140, 150, 160 that includes an overlap in the range of associated virtual nodes. For example, if virtual node group 100 were assigned to new virtual node group 130, 1000 virtual nodes would be retained, but if virtual node group 100 were assigned to new virtual node group 140, only 800 virtual nodes would be retained. Similarly, if virtual node group 110 were assigned to new virtual node group 130, 900 virtual nodes would be retained, and if virtual node group 110 were assigned to new virtual node group 150, 100 virtual nodes would be retained. Since virtual node group 120 only has overlap with new virtual node group 160, all 13584 nodes would be retained.

In one embodiment, in order to determine the reconfiguration plan, the cluster manager generates a data structure (e.g., a matrix) and populates the data structure with values reflecting the number of virtual nodes that would be retained. The cluster manager can use this data structure, and the values contained therein, to solve the problem of which virtual node groups in the current configuration 102 can be assigned to which virtual node groups in the new configuration 104 in order to minimize the number of movements of virtual nodes between physical nodes. Additional details of these techniques for efficient movement of virtual nodes during reconfiguration of the computing cluster are described below.

Figure 2:
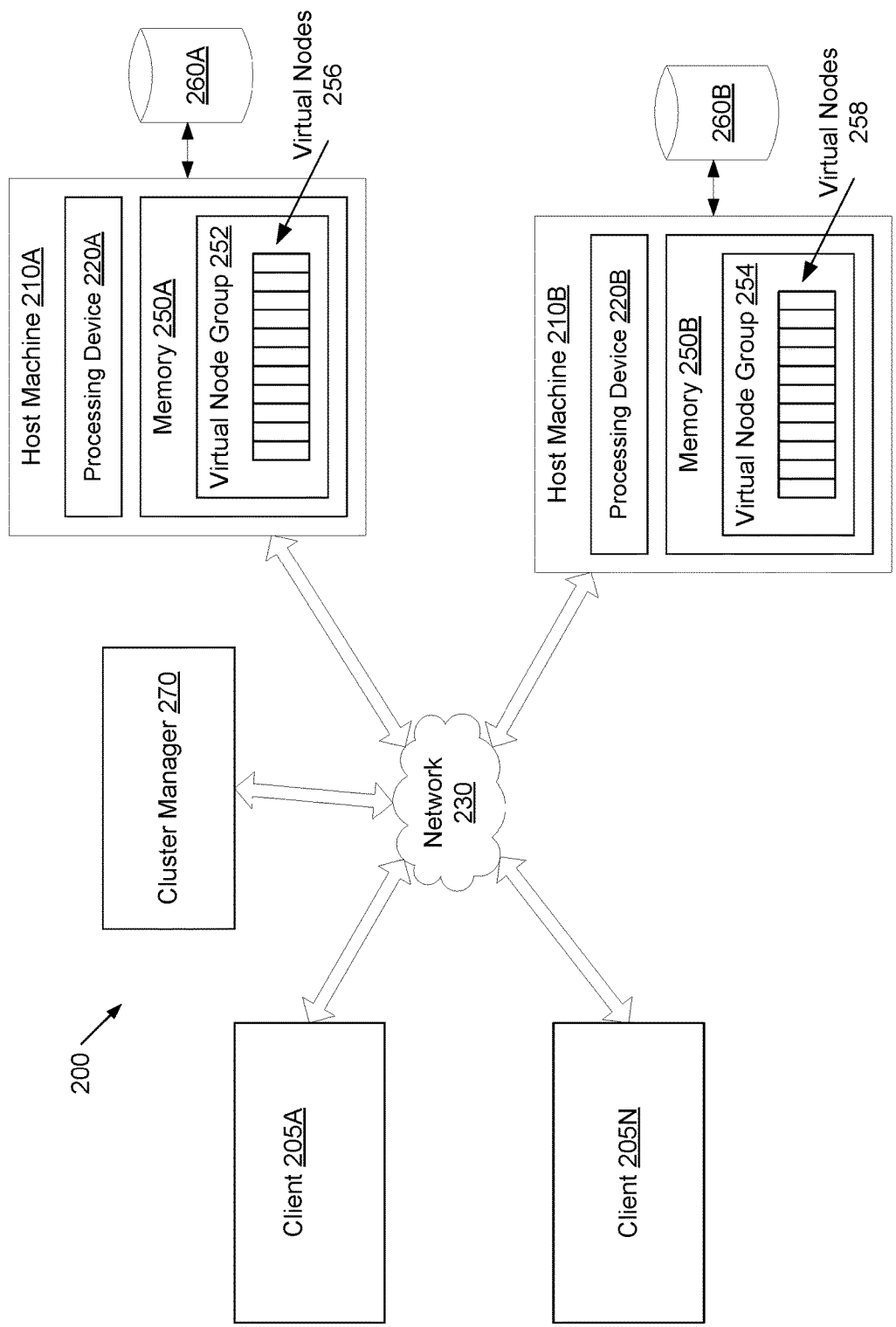
FIG. 2 is a block diagram of an exemplary network architecture, in which embodiments of the present disclosure may operate.

FIG. 2 is a block diagram of an exemplary network architecture 200, in which embodiments of the present disclosure may operate. In one embodiment, the network architecture 200 includes one or more host machines 210A-210B forming a computing cluster, which may be employed to provide cloud computing services to one or more client devices 205A-205N. The client devices 205A-205N may communicate with host machines 210A-210B via one or more networks 230. Client devices 205A-205N are representative of any number of clients which may utilize host machines 210A-210B for storing and accessing data in network architecture 200. Client devices 205A-205N are representative of any number of stationary or mobile computers such as desktop personal computers (PCs), servers, server farms, workstations, laptops, handheld computers, servers, personal digital assistants (PDAs), smart phones, and so forth. It is noted that some systems may include only a single client device, connected directly or remotely, to host machines 210A-210B.

In alternative embodiments, the number and type of client devices, host machines, and data storage devices is not limited to those shown in FIG. 2. At various times one or more clients may operate offline. In addition, during operation, individual client device connection types may change as users connect, disconnect, and reconnect to network architecture 200. Further, the systems and methods described herein may be applied to directly attached computing systems or network attached computing systems and may include a host operating system configured to perform one or more aspects of the described methods. Numerous such alternatives are possible and are contemplated.

In one embodiment, network 230 may utilize a variety of techniques including wireless connections, direct local area network (LAN) connections, wide area network (WAN) connections such as the Internet, a router, storage area network, Ethernet, and others. Network 230 may comprise one or more LANs that may also be wireless. Network 230 may further include remote direct memory access (RDMA) hardware and/or software, transmission control protocol/ internet protocol (TCP/IP) hardware and/or software, router, repeaters, switches, grids, and/or others. Protocols such as Fibre Channel, Fibre Channel over Ethernet (FCoE), iSCSI, and so forth may be used in network 230. The network 230 may interface with a set of communications protocols used for the Internet such as the Transmission Control Protocol (TCP) and the Internet Protocol (IP), or TCP/IP.

In one embodiment, each host machine 210A-210B may be associated with one or more data storage devices 260A-260B. Examples of data storage devices include solid-state drives (SSDs), flash memory, magnetic or optical disks, tape drives, RAID arrays, EEPROM devices, storage area networks, network-attached storage, and/or any other devices capable of storing data.

Host machines 210A-210B may each include one or more processing devices 220A-220B, each comprising one or more processor cores. Each processor core includes circuitry for executing instructions according to a predefined general-purpose instruction set. The processor cores may access cache memory subsystems for data and computer program instructions. The cache subsystems may be coupled to a memory hierarchy comprising random access memory (RAM) 250A-250B and a storage device 260A-260B. Each of memories 250A-250B may include a corresponding virtual node group and a set of one or more associated virtual nodes. For example, memory 250A on host machine 210A may include virtual node group 252 and virtual nodes 256, while memory 250B on host machine 210B may include virtual node group 254 and virtual nodes 258. As described herein, when a host machine is added to or removed from the computing cluster of host machines, or when a new configuration is received including different sets of virtual node groups, certain virtual nodes may be reassigned to different virtual node groups and/or moved to different physical nodes (i.e., host machines).

In one embodiment, network architecture 200 further includes cluster manager 270. Cluster manager 270 may be a standalone machine connected to host machines 210A-210B via network 230 or may be distributed across two or more physical machines, including the standalone machine, host machines 210A-210B and/or other machines. In one embodiment, given a current configuration (i.e., which virtual nodes are currently assigned to which virtual node groups) and a new configuration, cluster manager 270 may generate a reconfiguration plan to arrange virtual nodes into the desired virtual node groups while minimizing a number of movements of virtual nodes between physical nodes, as described in more detail below.

Figure 3:
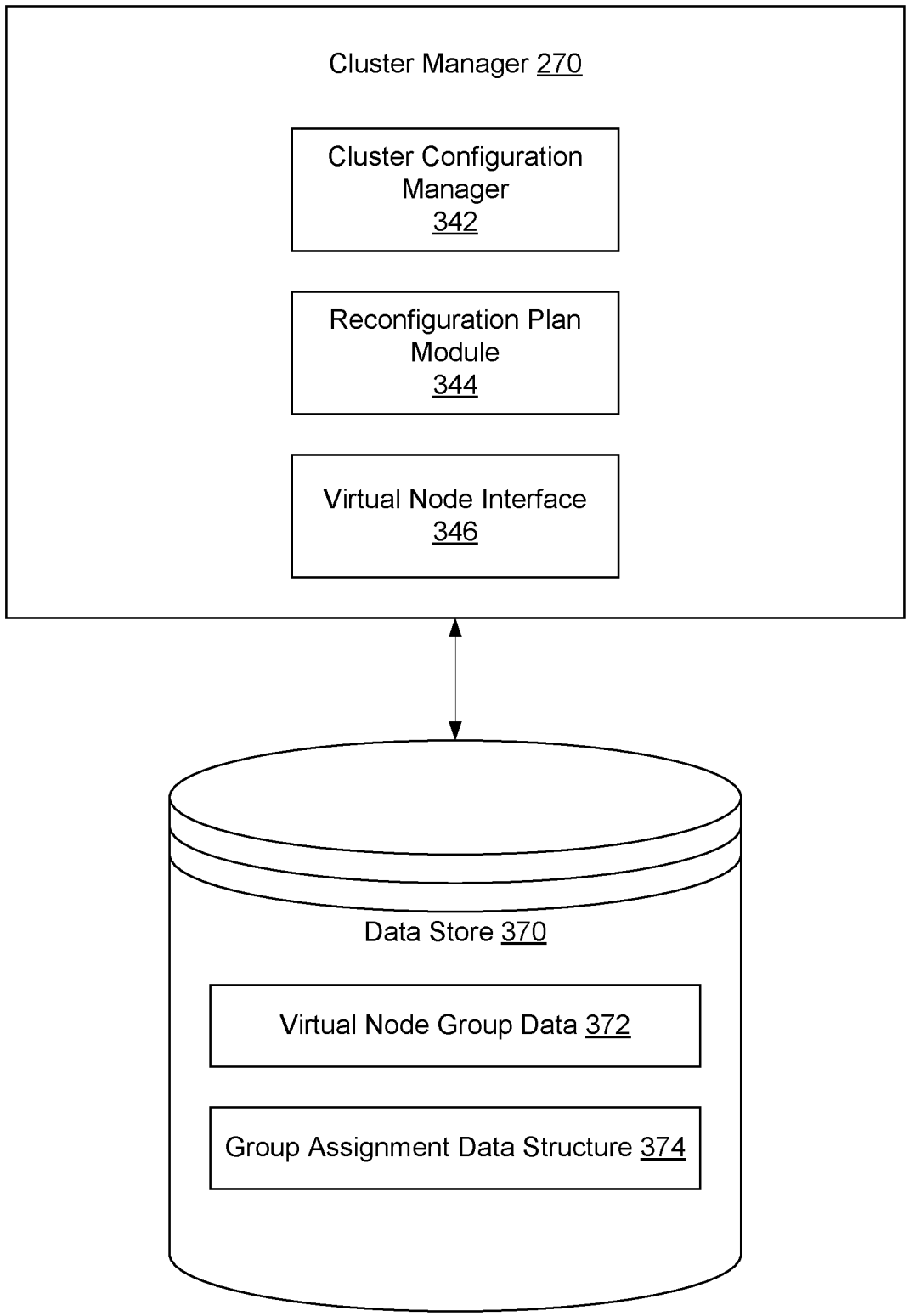
FIG. 3 is a block diagram illustrating a cluster manager, according to an embodiment.

FIG. 3 is a block diagram illustrating a cluster manager, according to an embodiment. In one embodiment, cluster manager 270 includes cluster configuration manager 342, reconfiguration plan module 344 and virtual node interface 346. This arrangement of modules and components may be a logical separation, and in other embodiments, these modules or other components can be combined together or separated in further components, according to a particular implementation. In one embodiment, data store 370 is connected cluster manager 270 and includes virtual node group data 372 and a group assignment data structure 374. In one implementation, one physical node may include both cluster manager 270 and data store 370. In another embodiment, data store 370 may be external to the physical node and may be connected over a network or other connection. In other implementations, the physical node and cluster manager 270 may include different and/or additional components and applications which are not shown to simplify the description. Data store 370 may be embodied on one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one embodiment, cluster configuration manager 342 identifies a current configuration and a new configuration for the computing cluster. The current configuration may define which virtual nodes are currently assigned to which virtual node groups in the cluster. In one embodiment, a mapping between virtual nodes and virtual node groups exists as part of virtual node group data 372 in data store 370, which can be read by cluster configuration manager 342. In another embodiment, cluster configuration manager 342 can perform a scan of the various physical nodes in the cluster to identify which virtual nodes are associated which each physical node and the corresponding virtual node group. In one embodiment, a system administrator or a customer utilizing the computing cluster to execute cloud computing services may make a request or command to reconfigure the computing cluster. In such an instance, cluster configuration manager 342 may receive the new configuration as part of the request. The new configuration may include one or more changes to the existing virtual node groups including the addition or removal of one or more groups and/or the rebalancing of virtual nodes among those groups. In another embodiment, the new configuration may be self-identified by cluster configuration manager 342 and may not require any customer or administrator input. For example, cluster configuration manager 342 may detect that certain virtual nodes were particularly resource intensive and may automatically determine a rebalancing of the virtual nodes in the cluster in order to better distribute cluster resources. Regardless of how the new configuration is determined, cluster configuration manager 342 may update virtual node group data 372 with the new configuration information.

In one embodiment, reconfiguration plan module 344 generates a reconfiguration plan to arrange virtual nodes into the desired virtual node groups specified in the new configuration while minimizing a number of movements of virtual nodes between physical nodes. In one embodiment, reconfiguration plan module 344 identifies an assignment mapping between existing virtual node groups and new virtual node groups for the new configuration that will minimize how many virtual nodes are actually moved from one physical node to another. To determine this assignment mapping, reconfiguration plan module 344 may utilize group assignment data structure 374, stored in data store 370. Additional details of generating the reconfiguration plan are provided below with respect to FIGS. 5-6G.

In one embodiment, virtual node interface 346 facilitates the actual movement of virtual nodes from one physical node to another. As a result of the reconfiguration plan determined by reconfiguration plan module 344, there may still be some virtual nodes to be moved (although the plan seeks to minimize this number). In one embodiment, virtual node interface 346 copies the underlying data associated with a virtual node from a source physical node to a destination physical node to associate the virtual node with the virtual node group corresponding to the destination physical node.

Figure 4:
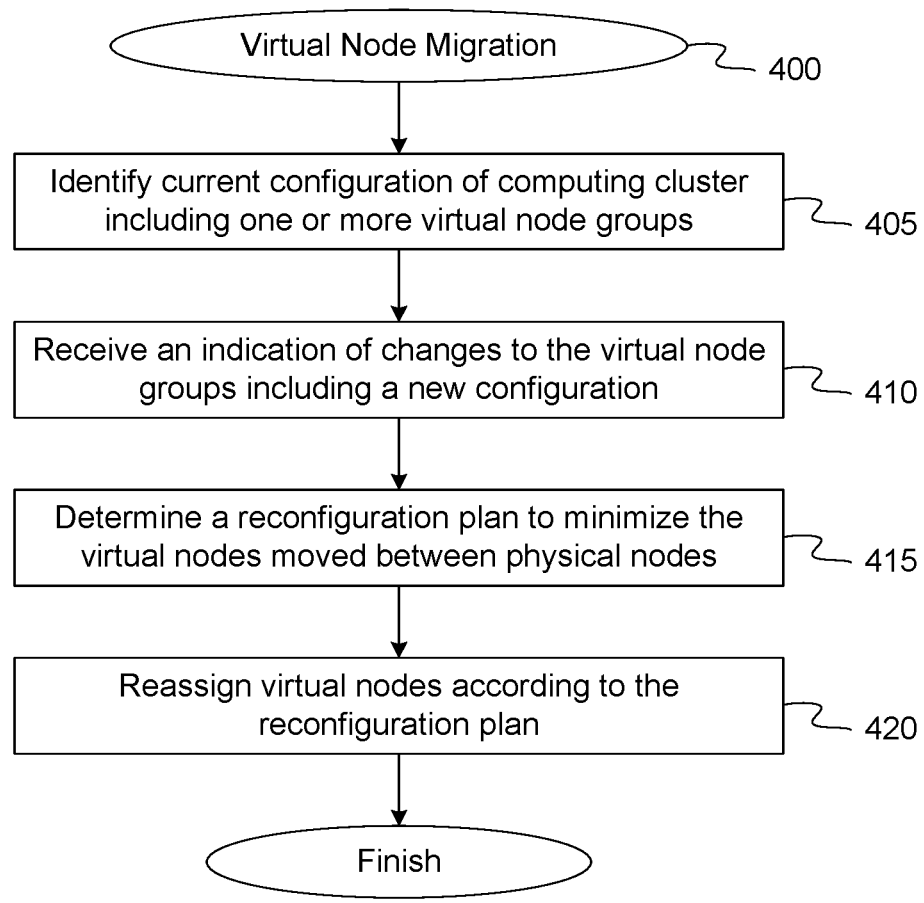
FIG. 4 is a flow diagram illustrating a method of virtual node migration during reconfiguration of a computing cluster, according to an embodiment.

FIG. 4 is a flow diagram illustrating a method of virtual node migration during reconfiguration of a computing cluster, according to an embodiment. The method 400 may be performed by processing logic that comprises hardware (e.g., circuitry, dedicated logic, programmable logic, microcode, etc.), software, firmware, or a combination thereof. The processing logic is configured to identify a current configuration (i.e., which virtual nodes are currently assigned to which virtual node groups) and a new configuration, and generate a reconfiguration plan to arrange virtual nodes into the desired virtual node groups while minimizing a number of movements of virtual nodes between physical nodes. In one embodiment, method 400 may be performed by cluster manager 270, as shown in FIGS. 2 and 3.

Referring to FIG. 4, at block 405, method 400 identifies a current configuration of a computing cluster comprising a plurality of physical nodes 210A-210B. In one embodiment, the current configuration defines which of a plurality of virtual nodes are associated with each of a plurality of current virtual node groups, wherein each current virtual node group is associated with a different one of the plurality of physical nodes 210A-210B in the computing cluster. In one embodiment, cluster configuration manager 342 reads a mapping between virtual nodes and virtual node groups in virtual node group data 372. In another embodiment, cluster configuration manager 342 can perform a scan of the various physical nodes in the cluster to identify which virtual nodes are associated which each physical node and the corresponding virtual node group.

At block 410, method 400 receives an indication of one or more changes to the virtual node groups including a new configuration for the computing cluster. In one embodiment, the new configuration defines a plurality of new virtual node groups that is different than the current virtual node groups. In one embodiment, cluster configuration manager 342 receives the new configuration information as part of a request to reconfigure the computing cluster. The new configuration may include one or more changes to the existing virtual node groups including the addition or removal of one or more groups and/or the rebalancing of virtual nodes among those groups.

At block 415, method 400 determines a reconfiguration plan to arrange the virtual nodes into the new virtual node groups specified in the new configuration while minimizing a number of virtual nodes to be moved between physical nodes. In one embodiment, reconfiguration plan module 344 identifies an assignment mapping between existing virtual node groups and new virtual node groups for the new configuration that will minimize how many virtual nodes are actually moved from one physical node to another. To determine this assignment mapping, reconfiguration plan module 344 may utilize group assignment data structure 374, stored in data store 370. Additional details of generating the reconfiguration plan are provided below with respect to FIGS. 5-6G.

At block 420, method 400 reassigns the virtual nodes from each of the current virtual node groups to one of the new virtual node groups according to the reconfiguration plan. In one embodiment, virtual node interface 346 further copies the underlying data associated with a virtual node from a source physical node to a destination physical node to associate the virtual node with the virtual node group corresponding to the destination physical node.

Figure 5:
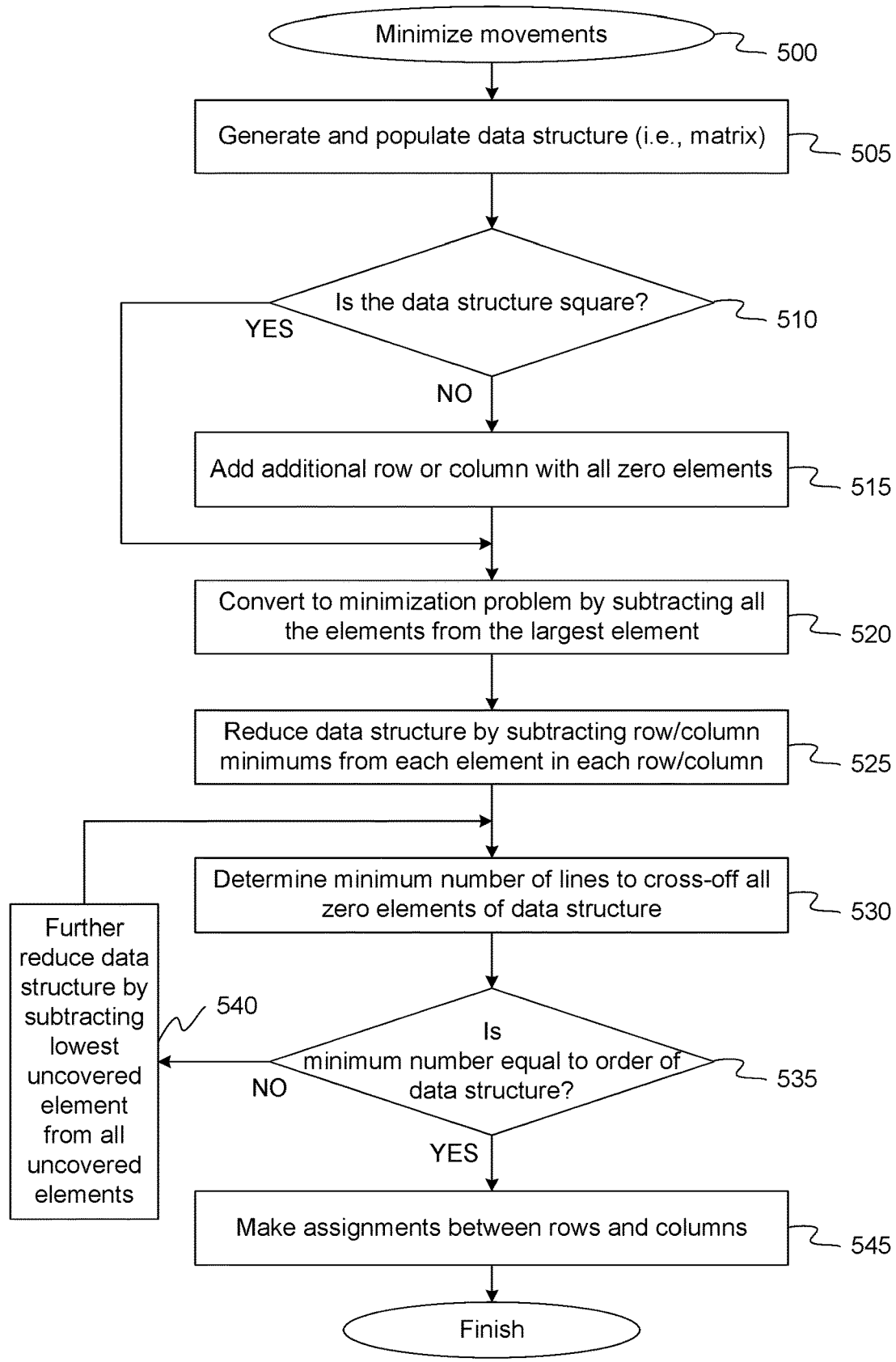
FIG. 5 is a flow diagram illustrating method of minimizing virtual node movements during reconfiguration of a computing cluster, according to an embodiment.

FIG. 5 is a flow diagram illustrating method of minimizing virtual node movements during reconfiguration of a computing cluster, according to an embodiment. The method 500 may be performed by processing logic that comprises hardware (e.g., circuitry, dedicated logic, programmable logic, microcode, etc.), software, firmware, or a combination thereof. The processing logic is configured to assign current virtual node groups to new virtual node groups, specified in a new cluster configuration, in such a manner that the number of virtual nodes to be moved between physical nodes is minimized. In one embodiment, method 400 may be performed by cluster manager 270, as shown in FIGS. 2 and 3.

Referring to FIG. 5, at block 505, method 500 generates a data structure (e.g., a matrix) and populates the data structure with values reflecting the current and new configurations of the computing cluster. In one embodiment, the data structure is an m×n matrix M, where m is the number of virtual node groups in the current configuration and n is the number of virtual node groups in the new configuration. The individual elements in matrix M can be denoted by $M_{ij}$, where the maximum value of i is m and the maximum value of j is n. In one embodiment, the value of a particular element in the data structure is populated such that $M_{ij}$ represents a number of virtual nodes that are shared between current virtual node group i and new virtual node group j. An example data structure corresponding to the cluster of FIG. 1 is illustrated in FIG. 6A. The data structure is populated such that element $M_{11}$ corresponds to the number of virtual nodes (i.e., 1000) shared between virtual node group 100 corresponding to column S1 and virtual node group 130 corresponding to row D1. The rest of the data structure is populated in a similar fashion.

At block 510, method 500 determines whether the data structure is square. A square data structure has the same number of rows and columns. Since the computing cluster is being reconfigured, likely through the addition or removal of a physical node and a corresponding virtual node group, the number of virtual node groups in the current configuration and the number of virtual node groups in the new configuration are not likely to be equal. Thus, the data structure is not likely to be square.

If the data structure is not square, at block 515, method 500 adds an additional row or column to the data structure, as appropriate, and populates that row or column with all zero elements. As in FIG. 1, the current configuration includes three virtual node groups represented by columns S1, S2, S3 in FIG. 6A, and the new configuration includes four virtual node groups represented by rows D1, D2, D3, D4 in FIG. 6A. Since there are three columns and four rows, the data structure in FIG. 6A is not square and a fourth column S4 may be added and populated with all zero elements.

Once the data structure is square, at block 520, method 500 converts the data structure to solve for a minimization problem. In one embodiment, reconfiguration plan module 344 identifies the largest element in the data structure and subtracts each element from the value of that largest element, replacing the corresponding value with the result in the data structure. In the data structure of FIG. 6A, the largest element is 13584. FIG. 6B illustrates the results when each element is subtracted from 13584. For example, the element at $M_{11}$ was 1000, so 13584−1000=12584. Reconfiguration plan module 344 performs this process for each element in the data structure.

At block 525, method 500 reduces the data structure by subtracting the lowest value in each column and row from each element in the corresponding column and row. As illustrated in FIG. 6B, the lowest value (i.e., minimum or "min") in row D1 is 12584. Once 12584 is subtracted from each element in row D1, the result is illustrated in FIG. 6C. This will lead to at least one zero element in row D1, though there may be multiple zero elements if there were previously two equal elements in a row which also happen to be the lowest in that row. Reconfiguration plan module 344 repeats this procedure for all rows in the data structure, resulting in a data structure with at least one zero per row. Reconfiguration plan module 344 then repeats this same process for each column in the data structure. As illustrated in FIG. 6C, the lowest value in column S1 is 0. Thus, when 0 is subtracted from each element in column S1, the result is illustrated in FIG. 6D. Reconfiguration plan module 344 repeats this procedure for all columns in the data structure, resulting in a data structure that also has at least one zero per column.

At block 530, method 500 determines the minimum number of lines that can be used to cross-off all of the zero elements in the data structure. Since at this stage every line and every column has at least one zero element, all of the zero elements can always be covered by a number of straight and continuous horizontal or vertical lines equal to the order of the data structure (in this case four lines). In some situations, however, a combination of horizontal and vertical lines can be used to cover the zero elements using fewer lines that the order of the data structure. In one embodiment, reconfiguration plan module 344 utilizes König's theorem, which describes an equivalence between the maximum matching problem and the minimum vertex cover problem in bipartite graphs, to determine the minimum number of lines used to cover the zero elements. In other embodiments, reconfiguration plan module 344 utilizes algorithms to find the optimization of minimum vertex cover. As illustrated in FIG. 6E, given the placement of the zero elements in the data structure, all of the zero elements can be covered using only three lines (i.e., one vertical line through column S1, one vertical line through column S3, and one horizontal line through row D3).

At block 535, method 500 determines whether the minimum number of lines used to cover all of the zero elements determined at block 530 is equal to the order of the data structure. If the minimum number of lines is not equal to the order of the data structure (e.g., if the zero elements can be covered by three lines but the order of the matrix is four, as in the example of FIG. 6E), method 500 further reduces the data structure at block 540.

At block 540, method 500 reduces the data structure by identifying the lowest uncovered element in the data structure and subtracting the lowest element from every other uncovered element. In the example of FIG. 6E, the lowest uncovered element is 100. Once 100 is subtracted from each uncovered element in the data structure, the result is illustrated in FIG. 6F. In addition, at block 540, the lowest uncovered element is added to the value of the elements where the lines in FIG. 6E intersect. Thus, in FIG. 6F, 100 has been added to elements 100 at $M_{13}$ and $M_{33}$ to result in a value of 200 for those elements. Once reduced, method 500 returns to block 530 to cross-off all of the zero elements again.

Once the minimum number of lines is equal to the order of the data structure (e.g., if the zero elements can be covered by no fewer than four lines), at block 545, method 500 makes final assignments between the columns and rows.

In one embodiment, reconfiguration plan module 344 iterates through the rows in the data structure of FIG. 6G looking for a row that has only one zero element. In the example of FIG. 6G, row D1 has two zero elements, but row D2 only has one zero element. Since the only zero element in row D2 falls in column S1, the virtual node group 140 corresponding to row D2 can be assigned to the virtual node group 100 corresponding to column S1. After making the assignment, reconfiguration plan module 344 can cross off all remaining zero elements in column S1 (i.e., $M_{11}$). Reconfiguration plan module 344 continues iterating through the rows looking for another row that has only one zero element. Row D3 has two zero elements, but row D4 only has one zero element. Thus, the virtual node group 160 corresponding to row D4 can be assigned to the virtual node group 120 corresponding to column S3. Next, reconfiguration plan module 344 iterates through the columns looking for column that has only one zero element. Column S1 has already been assigned, column S2 has two zero elements, column S3 has already been assigned, but column S4 only has one zero element. Thus, the virtual node group 150 corresponding to row D3 can be assigned to column S4. Since column S4 was added to the data structure with all zero elements and doesn't have a corresponding virtual node group, the virtual node group 150 corresponding to row D3 can be formed as a new group on the newly added physical node in the computing cluster. Since all of the assignments have not yet been made, reconfiguration plan module 344 can return to iterate through the rows again looking for a row that has only one zero element. Row D1 has only one zero element, so the virtual node group 130 corresponding to row D1 can be assigned to the virtual node group 110 corresponding to column S2. This process can continue until all of the assignments have been made.

Once the assignments are made, virtual node interface 346 can move any virtual nodes that do not belong to the assigned virtual node group, as defined in the new configuration. For example, reconfiguration plan module 344 determined above that the virtual node group 140 corresponding to row D2 can be assigned to the virtual node group 100 corresponding to column S1. The new configuration 104 illustrated in FIG. 1, however, specifies that only virtual nodes 1001-1800 are to be part of virtual node group 140, but virtual node group 100 includes virtual nodes 1-1800. Thus, virtual node interface 346 can move virtual nodes 1-1000 to virtual node group 130, as specified in new configuration 104. Similarly, reconfiguration plan module 344 determined above that the virtual node group 130 corresponding to row D1 can be assigned to the virtual node group 110 corresponding to column S2. The new configuration 104 illustrated in FIG. 1, however, specifies that virtual nodes 1-1000 and 1901-2800 are to be part of virtual node group 130, but virtual node group 110 includes virtual nodes 1-1800. Thus, virtual node interface 346 can move virtual nodes 1801-1900 to virtual node group 150, as specified in new configuration 104. This results in only 1100 total slots being moved which is the minimum number of slots to be moved between physical machines in order to achieve the new configuration 104.

Figure 7:
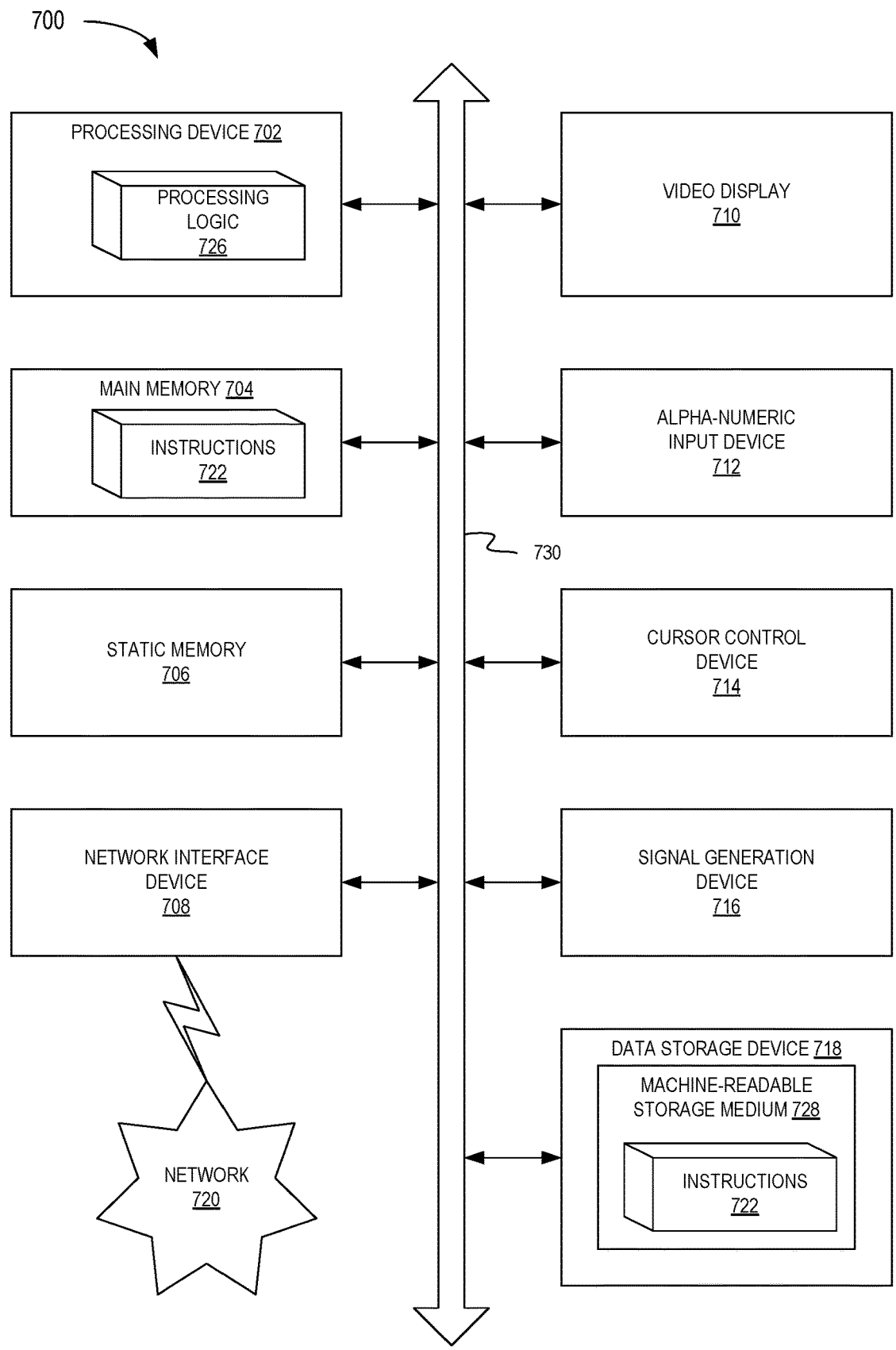
FIG. 7 is a block diagram illustrating one embodiment of a computer system, according to an embodiment.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a host machine, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of a computing device, such as host machines 210A-210B, cluster manager 270 or client devices 205A-205N.

The exemplary computer system 700 includes a processing device 702, a main memory 704 (e.g., read-only memory (ROM), flash memory, dynamic random access memory (DRAM) (such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 728, on which is stored one or more set of instructions 722 (e.g., software) embodying any one or more of the methodologies of functions described herein. The instructions 722 may also reside, completely or at least partially, within the main memory 704 and/or within the processing device 702 during execution thereof by the computer system 700; the main memory 704 and the processing device 702 also constituting machine-accessible storage media. The instructions 722 may further be transmitted or received over a network 720 via the network interface device 708.

The machine-readable storage medium 728 may also be used to store instructions for efficient movement of virtual nodes during reconfiguration of a computing cluster, as described herein. While the machine-readable storage medium 728 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic)

quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   identifying one or more virtual node groups associated with a computing cluster comprising a plurality of physical nodes, wherein each of the one or more virtual node groups comprises one or more virtual nodes associated with a corresponding one of the plurality of physical nodes;
   receiving a new configuration of the computing cluster, the new configuration comprising an indication of one or more changes to the one or more virtual node groups associated with the computing cluster; and
   determining, by a processor, a reconfiguration plan to reassign one or more of the virtual nodes from at least one of the one or more virtual node groups to a different virtual node group to effect the one or more changes while minimizing a number of virtual nodes to be moved between physical nodes.

2. The method of claim 1, wherein the new configuration is defined by at least one of a customer or a system administrator.

3. The method of claim 2, wherein the new configuration comprises at least one of an additional of a new physical node to the computing cluster or a removal of an existing physical node from the computing cluster.

4. The method of claim 1, wherein determining the reconfiguration plan comprises:
   generating a data structure with a plurality of elements, wherein each element represents a number of virtual nodes that would be retained if a corresponding existing virtual node group was matched to a corresponding new virtual node group; and
   converting the data structure to a square data structure.

5. The method of claim 4, wherein determining the reconfiguration plan further comprises:
   subtracting each of the plurality of elements in the data structure from the value of the largest element in the data structure; and
   reducing the data structure by subtracting the value of the smallest element in each row and column of the data structure from each other element in the corresponding row and column.

6. The method of claim 5, wherein determining the reconfiguration plan further comprises:
   determining a minimum number of straight lines that can be used to cross-off all of the zero elements in the data structure; and
   identifying any rows or columns in the data structure that have only a single zero element.

7. The method of claim 1, further comprising:
   reassigning the virtual nodes among the virtual node groups according to the reconfiguration plan.

8. A system comprising:
   one or more processors; and
   memory to store computer-executable instructions that, if executed, cause the one or more processors to:
      identify one or more virtual node groups associated with a computing cluster comprising a plurality of physical nodes, wherein each of the one or more virtual node groups comprises one or more virtual nodes associated with a corresponding one of the plurality of physical nodes;
      receive a new configuration of the computing cluster, the new configuration comprising an indication of one or more changes to the one or more virtual node groups associated with the computing cluster;
      determine a reconfiguration plan to reassign one or more of the virtual nodes from at least one of the one or more virtual node groups to a different virtual node group to effect the one or more changes while minimizing a number of virtual nodes to be moved between physical nodes; and
      reassign the virtual nodes among the virtual node groups according to the reconfiguration plan.

9. The system of claim 8, wherein the new configuration is defined by at least one of a customer or a system administrator.

10. The system of claim 9, wherein the new configuration comprises at least one of an additional of a new physical node to the computing cluster or a removal of an existing physical node from the computing cluster.

11. The system of claim 8, wherein to determine the reconfiguration plan, the one or more processors are configured to:
    generate a data structure with a plurality of elements, wherein each element represents a number of virtual nodes that would be retained if a corresponding existing virtual node group was matched to a corresponding new virtual node group; and
    convert the data structure to a square data structure.

12. The system of claim 11, wherein to determine the reconfiguration plan, the one or more processors are configured to:
    subtract each of the plurality of elements in the data structure from the value of the largest element in the data structure; and reduce the data structure by subtracting the value of the smallest element in each row and column of the data structure from each other element in the corresponding row and column.

13. The system of claim 12, wherein to determine the reconfiguration plan, the one or more processors are configured to:
   determine a minimum number of straight lines that can be used to cross-off all of the zero elements in the data structure; and
   identify any rows or columns in the data structure that have only a single zero element.

14. One or more non-transitory machine-readable mediums having stored therein instructions which, if performed by one or more processors, cause the one or more processors to:
   identify one or more virtual node groups associated with a computing cluster comprising a plurality of physical nodes, wherein each of the one or more virtual node groups comprises one or more virtual nodes associated with a corresponding one of the plurality of physical nodes;
   receive a new configuration of the computing cluster, the new configuration comprising an indication of one or more changes to the one or more virtual node groups associated with the computing cluster; and
   reconfigure the computing cluster to reassign one or more of the virtual nodes from at least one of the one or more virtual node groups to a different virtual node group according to the one or more changes while minimizing a number of virtual nodes to be moved between physical nodes.

15. The one or more non-transitory machine-readable mediums of claim 14, wherein the new configuration is defined by at least one of a customer or a system administrator, and wherein the new configuration comprises at least one of an additional of a new physical node to the computing cluster or a removal of an existing physical node from the computing cluster.

16. The one or more non-transitory machine-readable mediums of claim 14, wherein to reconfigure the computing cluster, the one or more processors are configured to:
   generate a data structure with a plurality of elements, wherein each element represents a number of virtual nodes that would be retained if a corresponding existing virtual node group was matched to a corresponding new virtual node group;
   convert the data structure to a square data structure;
   subtract each of the plurality of elements in the data structure from the value of the largest element in the data structure;
   reduce the data structure by subtracting the value of the smallest element in each row and column of the data structure from each other element in the corresponding row and column;
   determine a minimum number of straight lines that can be used to cross-off all of the zero elements in the data structure; and
   identify any rows or columns in the data structure that have only a single zero element.

17. The one or more non-transitory machine-readable mediums of claim 16, wherein to reconfigure the computing cluster, the one or more processors are configured to:
   reassign the virtual nodes among the virtual node groups according to the rows and columns in the data structure that have only a single zero element.

* * * * *